United States Patent
Hayashi et al.

(10) Patent No.: US 6,206,946 B1
(45) Date of Patent: Mar. 27, 2001

(54) FERTILIZER ABSORPTION ACCELERATOR COMPOSITION AND FERTILIZER COMPOSITION

(75) Inventors: Masaharu Hayashi; Tadayuki Suzuki; Masatoshi Kamei, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/051,278

(22) PCT Filed: Aug. 8, 1997

(86) PCT No.: PCT/JP97/02786

§ 371 Date: Apr. 7, 1998

§ 102(e) Date: Apr. 7, 1998

(87) PCT Pub. No.: WO98/06681

PCT Pub. Date: Feb. 19, 1998

(30) Foreign Application Priority Data

Aug. 9, 1996 (JP) ..................................................... 8-211118

(51) Int. Cl.⁷ ................................. C05D 3/02; C05G 5/00
(52) U.S. Cl. .................................... 71/31; 71/64.1; 71/903
(58) Field of Search ...................... 71/64.1, 903, DIG. 2, 71/31; 536/121; 514/23, 937

(56) References Cited

U.S. PATENT DOCUMENTS

| | | | |
|---|---|---|---|
| 4,337,094 | * 6/1982 | Tokar | 106/90 |
| 4,545,810 | * 10/1985 | Pyne et al. | 544/240 |
| 4,888,421 | * 12/1989 | Whitehurst et al. | 536/121 |
| 5,622,911 | * 4/1997 | Hasebe et al. | 504/116 |
| 5,804,591 | * 9/1998 | Valcke et al. | 514/383 |
| 5,849,663 | * 12/1998 | Hasebe et al. | 504/116 |

FOREIGN PATENT DOCUMENTS

| | | |
|---|---|---|
| 1543509 | 9/1968 | (FR) . |
| 59-137384 | 8/1984 | (JP) . |
| 60-260487 | 12/1985 | (JP) . |
| 4202080 | 7/1992 | (JP) . |
| 653613 | 2/1994 | (JP) . |
| 710666 | 1/1995 | (JP) . |
| 7232982 | 9/1995 | (JP) . |

* cited by examiner

Primary Examiner—Steven P. Griffin
Assistant Examiner—Elin A Warn
(74) Attorney, Agent, or Firm—Birch, Stewart, Kolasch & Birch, LLP

(57) ABSTRACT

A fertilizer absorption accelerator composition is provided which is capable of accelerating the absorption in a plant of such fertilizer components as calcium, nitrogen, phosphorus, and potassium. The composition is obtained by combining a fertilizer component with a surfactant and a heptonic acid or a salt thereof and is applied to the plant as sprayed to the surface of leaves thereof.

20 Claims, No Drawings

FERTILIZER ABSORPTION ACCELERATOR COMPOSITION AND FERTILIZER COMPOSITION

This application is the national phase under 35 U.S.C. §371 of prior PCT International Application No. PCT/JP97/02786 which has an International filing date of Aug. 8, 1997 which designated the United States of America, the entire contents of which are hereby incorporated by reference.

BACKGROUND OF THE INVENTION

1. Field of the Invention

This invention relates to a fertilizer absorption accelerator and a fertilizer composition and more particularly to a fertilizer absorption accelerator composition which is added to a fertilizer adapted for use on plants by application to or spray on roots, stems, leaves, or fruits thereof for the purpose of preventing the plants from developing physiological lesions due to nutrient deficiency.

2. Description of Related Art

It is known that plants require various nutrient elements for their growth and that they suffer obstruction of growth when they are not supplied sufficiently with nutrient elements. As respects the three major elements of fertilizer, for example, nitrogen forms a component element of proteins, phosphorus not only constitutes itself a component element of nucleic acids and phospholipids but also fulfills an important role in the energy metabolism and the reactions for synthesis and decomposition of substances, and potassium discharges physiological functions of mass metabolism and mass transfer. Insufficient supply of these main components generally renders the growth of plants inferior. Calcium is an important component for the constitution of plants themselves and cells thereof and plays the important role of balancing the metabolic system. It is, however, prone to assume the symptom of deficiency and induce such phenomena as, for example, tip rot in tomatoes, core rot in white rapes and cabbages, bitter pit in apples, and tip burn in strawberries.

Since these elements are not always present copiously in the soil, various kinds of fertilizer are used in the soil to ensure sufficient supply of nutrient elements. When the soil is deficient in nitrogen, phosphorus, and potassium, for example, the practice of incorporating a chemical fertilizer into the soil is followed.

As respects the physiological obstacle due to deficiency in calcium, the practice of precluding the calcium deficiency by incorporating lime or other calcium source into the soil has been often tried. More often than not, however, the calcium thus supplied is not thoroughly absorbed into the plants because part of the calcium reacts with the carbon dioxide in the air and escapes ultimately in the form of calcium carbonate into the underground, because the calcium reacts with other incorporated chemical fertilizer and consequently incurs inactivation, and because the incorporation of the chemical fertilizer and that of the calcium component are not well balanced. Even when the calcium is absorbed somehow or other through the root of a plant, it often fails to reach the site at which the physiological lesion actually develops because this element incurs unusual difficulty in migrating inside the system of a plant. When it reaches the site at all, it takes a considerable amount of time to do so and it fails to manifest an immediate effect on the lesion.

In recent years, therefore, it is tried to avoid a plant from a physiological lesion due to deficiency in calcium by directly spraying a calcium fertilizer in the form of an aqueous solution to leaves and fruits of the plant, which will easily suffer from such a lesion (the so-called foliage spray).

As compounds which are intended for use in such calcium fertilizers as utilize the technique of foliage spray mentioned above, such water-soluble calcium salts as calcium formate (JP-A-59-137,384), calcium acetate (JP-A-60-260,487), and calcium propionate (Japanese Patent Application No. 04-202,080) have been known. The calcium fertilizer including a calcium salt of high solubility and a calcium salt of low solubility in combination has been also known in JP-A 7-10666.

The direct spray of the aqueous solution of a calcium salt, however, has the problem of poor efficiency of absorption because the degree with which calcium is absorbed into the plant through the leaves and the fruits thereof is generally low. Further, an effort to spray such excessive fertilizer components as N, P, K, and calcium with a view to heightening the ratio of absorption ironically results in imparting stress to the plant and causes toxicity to the plant. The desirability of developing a measure for enabling a plant to attain efficient absorption of calcium and various other fertilizer components, therefore, has been finding widespread acceptance.

DISCLOSURE OF THE INVENTION

Summary of the Invention

The present inventors have made a diligent study with a view to solving the problems mentioned above. They have consequently found that the combination of a surfactant with a heptonic acid or a salt thereof allows a plant to attain efficient absorption of fertilizer components and that a fertilizer composition containing a surfactant in combination with a heptonic acid or a salt thereof, when sprayed to the roots or the leaves of the plant, enables the plant to absorb the nutrient efficiently. The present invention has been perfected as a result.

Specifically, this invention aims to provide a fertilizer absorption accelerator composition characterized by containing a surfactant and a heptonic acid or a salt thereof as essential components thereof. This invention also aims to provide a fertilizer composition characterized by comprising a fertilizer component and the fertilizer absorption accelerator composition mentioned above.

Further, this invention aims to provide a method for accelerating the growth of a plant by supplying to the plant an aqueous solution, aqueous dispersion, or emulsion containing a fertilizer component, a surfactant, and a heptonic acid or a salt thereof.

This invention also aims to provide a method for accelerating the growth of a plant by supplying to the plant an aqueous solution, aqueous dispersion, or emulsion containing a surfactant and a heptonic acid or a salt thereof in concert with a fertilizer component.

Detailed Description of the Invention

The following surfactants are effectively usable in the present invention.

As concrete examples of the nonionic surfactant, sorbitan fatty acid esters, polyoxyalkylene sorbitan fatty acid esters, polyoxyalkylene fatty acid esters, glycerin fatty acid esters, polyoxyalkylene glycerin fatty acid esters, polyglycerin fatty acid esters, polyoxyalkylene polyglycerin fatty acid esters, sucrose fatty acid esters, resin acid esters, polyoxyalkylene resin acid esters, polyoxyalkylene alkyl ethers, polyoxyalkylene alkylphenyl ethers, alkyl (poly)glucoside, and polyoxyalkylene alkyl (poly)glucoside may be cited.

As concrete examples of the anionic surfactant, carboxylic acid type, sulfonic acid type, sulfuric acid ester type, and phosphoric acid ester type surfactants may be cited.

As concrete examples of the carboxylic acid type surfactants, fatty acids of 6–30 carbon atoms or salts thereof, polycarboxylic acids or salts thereof, polyoxyalkylene alkyl ether carboxylic acids or salts thereof, polyoxyalkylene alkyl amide carboxylic acids or salts thereof, rhodinic acids or salts thereof, dimer acids or salts thereof, polymer acids or salts thereof, tall oil fatty acids or salts thereof may be cited.

As concrete examples of the sulfonic acid type surfactants, alkyl benzenesulfonic acids or salts thereof, alkyl sulfonic acids or salts thereof, alkyl naphthalenesulfonic acids or salts thereof, naphthalenesulfonic acids or salts thereof, diphenyl ether sulfonic acids or salts thereof, condensates of alkyl naphthalenesulfonic acids or salts thereof, and condensates of naphthalenesulfonic acids or salts thereof may be cited.

As concrete examples of the sulfuric acid ester type surfactants, alkyl sulfuric acid esters or salts thereof, polyoxyalkylene alkyl sulfuric acid esters or salts thereof, polyoxyalkylene alkylphenyl ether sulfuric acids or salts thereof, tristyrenated phenol sulfuric acid esters or salts thereof, and polyoxyalkylene distyrenated phenol sulfuric acid esters or salts thereof may be cited.

As concrete examples of the phosphoric acid ester type surfactants, alkyl phosphoric esters or salts thereof, alkyl phenyl phosphoric acid esters or salts thereof, polyoxyalkylene alkyl phosphoric acid esters or salts thereof, and polyoxy-alkylene alkylphenyl phosphoric acid esters or salts thereof may be cited.

The salts of these compounds include metal salts (such as Na, K, Ca, Mg, and Zn), ammonium salts, alkanol amine salts, and fatty acid amine salts, for example.

The amphoteric surfactants include amino acid type, betaine type, imidazoline type, and amine oxide type surfactants, for example.

The amino acid type surfactants include acylamino acid salts, acyl sarcosinic acid salts, acyloyl methylamino propionic acid salts, alkylaminopropionic acid salts, and acylamide ethyl hydroxyethylmethyl carboxylic acid salts, for example.

The betaine type surfactants include alkyl dimethyl betaine, alkyl hydroxyethyl betaine, acylamide propyl hydroxypropyl ammonia sulfobetaine, and ricinoleic acid amide propyl dimethyl carboxymethyl ammonia betaine, for example.

The imidazoline type surfactants include alkyl carboxymethyl hydroxyethyl imidazolinium betaine and alkyl ethoxycarboxymethyl imidazolinium betaine, for example.

The amine oxide type surfactants include alkyl dimethylamine oxides, alkyl diethanolamine oxides, and alkyl amide propylamine oxides, for example.

The surfactants cited above may be used either singly or in the form of a mixture of two or more members. When any of the surfactants mentioned above contains a polyoxyalkylene group, this group is preferred to be a polyoxyethylene group and the average number addition mols thereof is preferred to be in the range of 1–50.

As concrete examples of the heptonic acid or the salt thereof to be used effectively in this invention, glucoheptonic acid, mannoheptonic acid, and galaheptonic acid, and potassium salts, sodium salts, calcium salts, alkanol amine salts, and aliphatic amine salts thereof may be cited. As a preferred example thereof, sodium glucoheptonate may be cited. While heptonic acids are known in isomers, they may be α-isomers or β-isomers, whichever better suit occasion.

The fertilizer absorption accelerator composition of this invention contains the surfactant and the heptonic acid or salt thereof mentioned above as essential components thereof and water as the balance and, when necessary, further contains a solvent as an arbitrary component thereof.

The fertilizer composition of this invention contains the surfactant and the heptonic acid or a salt thereof mentioned above and further contains a fertilizer component. As concrete examples of the fertilizer component, inorganic substances or organic substances which contain such elements as N, P, K, Ca, Mg, S, B, Fe, Mn, Cu, Zn, Mo, Cl, Si, and Na may be cited. Among other substances mentioned above, compounds containing Ca prove to be particularly preferable. As concrete examples of the calcium compound effectively usable in the calcium fertilizer composition, inorganic calcium salts such as calcium chloride, calcium nitrate, calcium carbonate, calcium sulfate, quick lime, and slaked lime and calcium salts of such organic acids as acetic acid, formic acid, oxalic acid, lactic acid, gluconic acid, succinic acid, citric acid, tartaric acid, malic acid, heptonic acid, gluconic acid, glycine, adipic acid, and ethylene diamine tetraacetic acid may be cited. These calcium compounds may be used either singly or in the form of a mixture of two or more members. Preferably, one calcium compound or a mixture of two calcium compounds is used.

In this invention, though the proportions of the surfactant, the heptonic acid or salt thereof, and the fertilizer component to be mixed can be varied when necessary, the proportion of the surfactant is in the range of 0.1–30 parts by weight, that of the heptonic acid or a salt thereof in the range of 0.01–20 parts by weight, and that of the fertilizer component in the range of 1–60 parts by weight generally in the ultimately formed fertilizer composition which additionally contains water and/or a solvent as occasion demands.

The fertilizer composition of this invention may be in the form of solution, flowable powder, wettable powder, granules, or dust. Generally, it is diluted to 50–1000 times the original volume and sprayed in the form of aqueous solution, aqueous dispersion, or emulsion on the leaves or roots of a plant. A liquid preparation of the composition containing 5–20 wt. % of the surfactant, 0.5–10 wt. % of the heptonic acid or a salt thereof, and 10–60 wt % of the fertilizer component in water as the medium proves to be particularly preferable.

Various means can be used for the supply of the fertilizer composition of this invention to a plant. As concrete examples of the effective method of supply, the direct spray of a diluted aqueous solution of the composition on the leaves, stems, and fruits of a plant, the injection of the aqueous solution into the soil, the water culture, the circulation of the aqueous solution past such absorbent as rock wool which is held in direct contact with the roots of a plant, and the continuous addition of the diluted solution to the feed water to a plant may be cited.

The fertilizer absorption accelerator composition and the fertilizer composition of this invention can be used as sprayed on various farm produces because they cause no toxic damage to plants and enable plants to absorb efficiently therein calcium and other fertilizer components.

EXAMPLES

Now, this invention will be described below with reference to examples. It should be noted, however, that this invention is not limited to these examples.

Examples of Formulation

The product (1) of this invention was typically formulated as follows. The other products (2)–(6) of this Invention were prepared by following the same procedure.

In a proper amount of tap water, $CaCl_2.2H_2O$ as a calcium source was dissolved in an amount calculated to account for a final concentration of 40 wt. % and sodium α-glucoheptonate (manufactured by Croda Japan) in an amount calculated to account for a final concentration of 10 wt. % in the formed preparation. The resultant aqueous solution was adjusted with a 0.1N hydrochloric acid to pH 7.0. In this solution, a polyoxyethylene (average number of addition mols=20) sorbitan oleic acid ester (produced by Kao Corporation and marketed under trademark designation of "Rheodol TW-0 120"), a nonionic surfactant, was dissolved in an amount calculated to account for a final concentration of 10 wt. % in the preparation and tap water was added to a prescribed total volume. The product was a weakly yellow transparent aqueous solution.

For comparison, a comparative product (7) formed of $CaCl_2.2H_2O$ and sodium α-glucoheptonate, a comparative product (8) formed solely of $CaCl_2.2H_2O$, a comparative product (9) formed of $CaCl_2.2H_2O$ and sodium gluconate, a comparative product (10) formed of $CaCl_2.2H_2O$ and sodium ascorbate, a comparative product (11) formed of $CaCl_2.2H_2O$ and the nonionic surfactant mentioned above, and a comparative product (12) formed of calcium formate powder were used in the experiment.

The formulas of these calcium preparations are shown Table 1.

TABLE 1

| Preparation No. | Raw materials used in composition | Proportions of mixture (%) |
|---|---|---|
| | Product of the invention | |
| (1) | $CaCl_2.2H_2O$ | 40 |
| | Sodium α-heptonate | 10 |
| | POE(20) sorbitan monooleate | 10 |
| (2) | $CaCl_2.2H_2O$ | 40 |
| | Sodium α-heptonate | 5 |
| | POE(25) hardened castor oil | 10 |
| (3) | $CaCl_2.2H_2O$ | 40 |
| | Sodium α-heptonate | 10 |
| | POE(15) glycerin beef tallow fatty acid ester | 20 |
| (4) | $CaCl_2.2H_2O$ | 40 |
| | Sodium α-heptonate | 5 |
| | PEO(3) sodium salt of lauryl sulfuric acid ester | 5 |
| (5) | $Ca(NO_3).4H_2O$ | 40 |
| | Sodium α-heptonate | 20 |
| | Lauryl dimethyl amine oxide | 5 |
| (6) | Calcium formate | 40 |
| | Sodium α-heptonate | 10 |
| | Polyglycerin monooleate (degree of condensation 5) | 20 |
| | Comparative product | |
| (7) | $CaCl_2.2H_2O$ | 40 |
| | Sodium α-heptonate | 10 |
| (8) | $CaCl_2.2H_2O$ | 40 |
| (9) | $CaCl_2.2H_2O$ | 40 |
| | Sodium gluconate | 10 |
| (10) | $CaCl_2.2H_2O$ | 40 |
| | Sodium ascorbate | 10 |
| (11) | $CaCl_2.2H_2O$ | 40 |
| | POE(20) sorbitan monooleate | 10 |
| (12) | Calcium formate | 40 |

Water was used for the balances of the formulations.

(Note) The symbol POE in the table stands for polyoxyethylene and the parenthesized numerals following the POE represent the average numbers of addition mols of ethylene oxide.

Example 1

Trial Supply of Calcium to Leaves of White Rapes

Seeds of white rape (produced by Takii Shubyo K.K. and marketed under trademark designation of "Muso") were procured and sown in pots, 11 cm in diameter. The amount of a fertilizer to be applied was set at this ratio of components, $N:P_2O_5:K_2O=0.2:0.2:0.2$ $kg/m^3$. The calcium preparations obtained by the formulations shown above were each sprayed four times one week apart after the second leaves had begun to develop. For this use, the preparations were each diluted to 200 times the original volume. The application rate was about 20 ml per plant which was enough to wet the leaves thereof sufficiently. At the end of the final round of the spraying, the second leaves were collected, given a thorough wash on the surface, dried, and heat-treated with 3N hydrochloric acid to extract Ca. The extract was assayed by the ICP (Inductively coupled argon plasma emission analysis). The Ca concentrations in the leaves of white rape per gram of dry weight were as shown in Table 2.

TABLE 2

| | Ca preparation No. | Concentration of Ca in leaves* (%) |
|---|---|---|
| Product of the invention | (1) | 3.85 |
| | (2) | 3.80 |
| | (3) | 3.78 |
| | (4) | 3.84 |
| | (5) | 3.80 |
| | (6) | 3.85 |
| Comparative product | (7) | 3.29 |
| | (8) | 3.15 |
| | (9) | 3.49 |
| | (10) | 3.44 |
| | (11) | 3.41 |
| | (12) | 3.23 |
| Control | Aqueous dispersion system | 2.81 |

*Concentration per gram of dry weight of white rape

It is noted from the results that the combination of a surfactant with sodium heptonate according to this invention notably accelerated the incorporation of Ca into white rapes as compared with various comparative products. This effect of the acceleration was conspicuously higher than sodium gluconate or sodium ascorbate.

Example 2

Trial Foliage Spray of Calcium to Calcium-deficient Soybeans

Seeds of soybean (produced by Takii Shubyo K.K. and marketed under trademark designation of "Yukimusume") were sown in a bed of vermiculite. The young seedlings issuing 10 days thereafter were subjected to water culture in an artificial acclimatizer. The water culture was performed in an Erlenmeyer flask, 500 ml in inner volume, under the conditions of 23° C. and 10,000 luxes, with the seedlings aerated with the aid of an air pump. For the water culture, the Jacobson culture medium of the composition shown in Table 3 was used and the Ca deficiency was induced by using sodium nitrate in the place of calcium nitrate. The various Ca preparations obtained by the formulations mentioned above were each sprayed three times four days apart after the start of the water culture. The application was performed by diluting a given preparation to 200 times and spraying the diluted solution to the plants at the foliage advertently lest the spray should come to the water of irrigation. The amount of foliage spray was about 10 ml per plant which was enough to wet the leaves thereof thoroughly. The whole soybeans in growth on plants were measured for wet weight to rate the avoidance of calcium deficiency relatively. The soybeans were separately cultured in a culture medium (Table 3) not suffering from calcium deficiency (standard water culture). The results of this standard water culture were compared in effect of foliage spray with those of the preparations applied to the soybeans suffering from calcium deficiency. The results of this comparison are shown in Table 4.

TABLE 3

| Jacobson culture medium for slop | |
| --- | --- |
| $Ca(NO_3)_2 \cdot 4H_2O$ | 708 ppm |
| $KNO_3$ | 303 ppm |
| $MgSO_4 \cdot 7H_2O$ | 493 ppm |
| $KH_2PO_4$ | 272 ppm |
| $FeCl_3$ | 5 ppm |
| Tartaric acid | 5 ppm |
| $H_3BO_3$ | 2.5 ppm |
| $CuCl_2 \cdot 2H_2O$ | 0.05 ppm |
| $MnCl_2 \cdot 4H_2O$ | 1.5 ppm |
| $Na_2MoO_4 \cdot 2H_2O$ | 0.025 ppm |
| $ZnCl_2$ | 0.1 ppm |

TABLE 4

| | Ca preparation No. | Wet weight of soybean (%) |
| --- | --- | --- |
| Product of the invention | (1) | 12.41 |
| | (2) | 12.33 |
| | (3) | 12.10 |
| | (4) | 12.44 |
| | (5) | 12.35 |
| | (6) | 12.56 |
| Comparative product | (7) | 8.70 |
| | (8) | 7.15 |
| | (9) | 10.18 |
| | (10) | 10.00 |
| | (11) | 9.34 |
| | (12) | 8.28 |
| Control | Aqueous dispersion system | 3.50 |
| | Standard water culture | 13.68 |

It is noted from the above that soybean was produced by the invention in the same weight as normal cultivation. Then the invention is capable of effectively avoiding Ca deficiency. The results of this avoidance were notably better than sodium gluconate or sodium ascorbate.

Example 3

Test for Effect of Incorporation of Ca Into Tomato Fruits

The species of tomato called "House Momotaro" was used. About one month after the seeds had been sown, seedlings each bearing 12 developed leaves were permanently planted. They were subjected to foliage spray of calcium 27 days and 36 days after the planting. The various Ca preparations obtained by the formulations mentioned above were used as diluted to 200 times the original volume and applied to the second fruit clusters and the upper and lower leaves of fruits in an amount of 100 ml enough to wet the plants thoroughly. The second fruit clusters were harvested about 35 days after the second round of spraying, given a wash on the surface with water, and heat-treated with 3N hydrochloric acid to extract Ca. The extract was assayed for Ca content by the ICP. The results were as shown in Table 5.

It is clearly noted from the results that the combination of a surfactant with sodium heptonate according to this invention notably accelerated the absorption of Ca into tomato fruits as compared with the comparative products. This effect of acceleration was notably high as compared with the products formed solely of Ca sources, the product formed solely of a surfactant, and the combinations using sodium gluconate and sodium ascorbate.

TABLE 5

| | Ca preparation No. | Concentration of Ca in fruits* (%) |
| --- | --- | --- |
| Product of the invention | (1) | 0.135 |
| | (2) | 0.130 |
| | (3) | 0.124 |
| | (4) | 0.136 |
| | (5) | 0.132 |
| | (6) | 0.135 |
| Comparative product | (7) | 0.084 |
| | (8) | 0.066 |
| | (9) | 0.105 |
| | (10) | 0.100 |
| | (11) | 0.096 |
| | (12) | 0.077 |
| Control | Aqueous dispersion system | 0.034 |

*Concentration per gram of wet weight of tomato fruits

What is claimed is:

1. A calcium fertilizer absorption accelerator composition comprising a surfactant and a heptonic acid or a salt thereof as essential components thereof, wherein said heptonic acid or a salt thereof is selected from the group consisting of glucoheptonic acid, mannoheptonic acid, and galaheptonic acid and potassium salts, sodium salts, alkanol amine salts, and aliphatic amine salts of said acids.

2. A composition according to claim 1, wherein said surfactant contains at least one member selected from the group consisting of nonionic surfactants, anionic surfactants, and amphoteric surfactants.

3. A calcium fertilizer composition comprising a fertilizer component, a surfactant, and a heptonic acid or a salt thereof as essential components thereof.

4. A composition according to claim 3, wherein said surfactant contains at least one member selected from the group consisting of nonionic surfactants, anionic surfactants, and amphoteric surfactants.

5. A composition according to claim 3, wherein said fertilizer component is an inorganic calcium salt selected from the group consisting of calcium chloride, calcium nitrate, calcium carbonate, calcium sulfate, quick lime, and slaked lime or the calcium salt of an organic acid selected from among formic acid, oxalic acid, acetic acid, lactic acid, gluclic acid, succinic acid, citric acid, tartaric acid, malic acid, gluconic acid, heptonic acid, adipic acid, glycine, and ethylene diamine tetraacetic acid.

6. A composition according to claim 3, which is in the form of solution, flowable powder, wettable powder, granules, or dust.

7. A composition according to claim 3, wherein said heptonic acid or a salt thereof is selected from the group consisting of glucoheptonic acid, mannoheptonic acid, and galaheptonic acid and potassium salts, sodium salts, alkanol amine salts, and aliphatic amine salts of said acids.

8. A composition according to claim 3, comprising a calcium fertilizer component, a surfactant and a heptonic sodium salt.

9. A method for accelerating the growth of a plant by supplying to the plant an aqueous solution, aqueous dispersion, or emulsion containing a calcium fertilizer component, a surfactant, and a heptonic acid or a salt thereof.

10. A method according to claim 9, wherein said supply is effected by spraying the preparation on the surface of leaves of said plant.

11. A method according to claim 9, wherein said heptonic acid or a salt thereof is selected from the group consisting of glucoheptonic acid, mannoheptonic acid, and galaheptonic acid and potassium salts, sodium salts, alkanol amine salts, and aliphatic amine salts of said acids.

12. A method for accelerating the absorption of a calcium fertilizer component into a plant by supplying to said plant an aqueous solution, aqueous dispersion, or emulsion containing a surfactant and a heptonic acid or a salt thereof in concert with said fertilizer component.

13. A method according to claim 12, wherein said heptonic acid or a salt thereof is selected from the group consisting of glucoheptonic acid, mannoheptonic acid, and galaheptonic acid and potassium salts, sodium salts, alkanol amine salts, and aliphatic amine salts of said acids.

14. A calcium fertilizer absorption accelerator composition comprising a surfactant and a heptonic acid or a salt thereof as essential components thereof, wherein said heptonic acid or a salt thereof is selected from the group consisting of:

(a) mannoheptonic acid, and galaheptonic acid and potassium salts, sodium salts, alkanol amine salts, and aliphatic amine salts of said acids, and (b) glucoheptonic acid and potassium salts, alkanol amine salts, and aliphatic amine salts of said acids.

15. A calcium fertilizer absorption accelerator composition comprising a surfactant and sodium glucoheptonate as essential components thereof.

16. A calcium fertilizer composition comprising 1–60 parts by weight of a fertilizer component, 0.1–30 parts by weight of a surfactant, and 0.01–20 parts by weight of a heptonic acid or a salt thereof as essential components thereof.

17. A method for accelerating the growth of a plant by supplying to the plant an aqueous solution, aqueous dispersion, or emulsion containing a calcium fertilizer component, a surfactant, and a heptonic acid or a salt thereof; wherein said aqueous solution, aqueous dispersion or emulsion results from diluting said fertilizer component, said surfactant, and said heptonic acid or salt thereof to 50–1000 times the original volume.

18. A method for accelerating the growth of a plant by supplying to the plant an aqueous solution, aqueous dispersion, or emulsion containing a calcium fertilizer, a surfactant, and a heptonic acid or a sodium salt thereof.

19. A method for accelerating the absorption of a calcium fertilizer into a plant by supplying to said plant an aqueous solution, aqueous dispersion, or emulsion containing a surfactant and a heptonic acid or a sodium salt thereof in concert with said fertilizer component.

20. A calcium fertilizer absorption accelerator composition comprising a surfactant and a heptonic sodium salt as essential components thereof.

\* \* \* \* \*